Patented Feb. 18, 1947

2,415,958

UNITED STATES PATENT OFFICE 2,415,958

METHOD OF PURIFYING METAL HALIDES

Bernard C. Meyers, Barberton, Ohio, assignor to Pittsburgh Plate Glass Company, Pittsburgh, Pa., a corporation of Pennsylvania No Drawing. Application November 7, 1942, Serial No. 464,921

6 Claims. (Cl. 23—87)

This invention relates to a method of purifying a stable normally liquid distillable tetrahalide of the fourth group of elements and/or to the removal of color bodies therefrom. The production of these halides often results in their recovery in an impure form. For example, titanium tetrachloride prepared by chlorination of ilmenite or similar ore often contains vanadium, iron, molybdenum, and possibly other unidentified impurities. Stannic chloride prepared by chlorination of tin ores or tin alloys often contains arsenic or antimony and may contain vanadium. Silicon tetrachloride or germanium tetrachloride may be similarly contaminated. These impurities are generally present in very small concentrations usually being about 0.01 to 0.1 percent by weight of the tetrachloride and are rarely present in concentrations above 5 percent by weight of the tetrachloride.

In accordance with the present invention it has been found that a large portion of these impurities may be removed by treatment with elemental sulphur. Following this treatment the liquid halide may be distilled and is found to be very pure and quite free from color.

The treatment may be effected by dissolving or dispersing the sulphur in the tetrahalide and allowing the solution to stand for a suitable period of time. Preferably, it is desirable to heat the tetrachloride under reflux for 15 minutes or more to increase the rate of reaction. The exact nature of the reaction which occurs is not known but it appears that the impurities are converted to compounds of higher boiling point, whereby upon distillation an effective separation of the impurities from the tetrachloride undergoing treatment is effected. The amount of sulphur utilized for treatment is capable of some variation and in general 0.5 to 2 percent by weight of the tetrachloride undergoing treatment is suitable.

The process is especially effective when small quantities of chlorine are dissolved in the metallic chloride. Thus, in purifying crude chlorides made by chlorination of metallic ores or other compounds the liquid or mixtures thereof the same preferred effect may be achieved without adding chlorine.

The reaction is benefitted by the presence of heavy metal soaps such as ferric stearate, nickel stearate, cobalt stearate, or the corresponding laurates, linoleates, oleates, palmitates, etc.

The process may alternatively be conducted in vapor phase by permitting the tetrachloride vapors to contact solid, liquid or gaseous sulphur halides. Subsequently the gas mixture may be fractionally condensed and redistilled, if necessary, to recover the purified product.

The following examples are illustrative:

Example I

Ten grams of sulphur was dissolved in 1700 grams of titanium tetrachloride containing 0.072 percent of vanadium and 0.4 percent of chlorine. The mixture was allowed to stand for 48 hours and was then heated to boiling temperature under a reflux condenser for one-half hour. Thereafter, the liquid was distilled and found to contain only 0.0002 percent vanadium. Upon distillation of the untreated tetrachloride, the distillate contained 0.064 percent vanadium.

Example II

Five grams of sulphur were dissolved in 1700 grams of titanium tetrachloride containing 0.072 percent of vanadium and no chlorine and the mixture treated as in Example I, and clear colorless titanium tetrachloride containing but 0.01 percent vanadium was obtained.

Example III

Impure distilled anhydrous stannic chloride having a distinct yellow color was thoroughly mixed with 0.1% elemental sulphur and heated. The mixture was then redistilled in an air tight distillation apparatus to yield a water-white stannic chloride.

Example IV

Crude titanium tetrachloride uid at a uniform rate such that all was added when the evaporation was completed. The condensed product was distilled fractionally and a water-white product containing 0.0003 percent vanadium was obtained.

While the invention is particularly directed to the removal of color from the liquid tetrachlorides above mentioned, it may be applied to the removal of color from other tetrahalides such as titanium tetrafluoride or titanium tetrabromide, or other metallic liquid halides such as stannic chloride, arsenic chloride and germanium tetrachloride, or the corresponding liquid bromides, fluorides, or iodides of silicon, tin, or germanium.

Although the present invention has been described with reference to the specific details of certain embodiments thereof, it is not intended that such details shall be regarded as limitations upon the scope of the invention, except insofar as included in the accompanying claims.

I claim:

1. A method of purifying substantially anhydrous normally liquid distillable halide of a metal of the fourth group which comprises contacting the metal halide with elemental sulphur and thereafter distilling the metal halide.

2. A method of purifying substantially anhydrous normally liquid distillable chloride of a metal of the fourth group which comprises heating the liquid chloride with elemental sulphur and subsequently distilling the liquid chloride.

3. A method of purifying titanium tetrachloride which comprises heating with elemental sulphur and thereafter distilling the titanium tetrachloride.

4. A method of purifying titanium tetrachloride which contains vanadium as an impurity therein which comprises treating the tetrachloride with sulphur for a time sufficient to convert the vanadium into a compound of higher boiling point than that of the titanium tetrachloride and distilling the titanium tetrachloride.

5. A method of purifying liquid titanium tetrachloride which comprises contacting the titanium tetrachloride with a substance of the group consisting of sulphur and sulphur halides and thereafter distilling the liquid titanium tetrachloride.

6. A method of purifying a substantially anhydrous normally liquid distillable halide of a metal of the fourth group which comprises contacting the metal halide with a substance of the group consisting of sulphur and sulphur halides and thereafter distilling the liquid metal halide.

BERNARD C. MEYERS.

REFERENCES CITED

The following references are of record in the file of this patent:

UNITED STATES PATENTS

| Number | Name | Date |
|---|---|---|
| 2,289,328 | Pechukas | July 7, 1942 |
| 2,270,444 | Jenness | Jan. 20, 1942 |

OTHER REFERENCES

Mellor, "Comprehensive Treatise on Inorganic and Theoretical Chemistry," vol. VI, pp. 965, 1925, and vol. IX, 1929, pp. 807–808.

Mellor, "Comprehensive Treatise on Inorganic and Theoretical Chemistry," vol. VII, 1927, page 84 (copy in Div. 59).